US006659398B2

(12) United States Patent
Serven

(10) Patent No.: US 6,659,398 B2
(45) Date of Patent: Dec. 9, 2003

(54) TWO-BRAKE TORQUE LIMITING DEVICE

(75) Inventor: Mark R. Serven, Verona, NJ (US)

(73) Assignee: Smiths Aerospace, Inc., Whippany, NJ (US)

( * ) Notice: Subject to any disclaimer, the term of this patent is extended or adjusted under 35 U.S.C. 154(b) by 0 days.

(21) Appl. No.: 09/943,654

(22) Filed: Aug. 31, 2001

(65) Prior Publication Data

US 2002/0030138 A1 Mar. 14, 2002

Related U.S. Application Data

(60) Provisional application No. 60/231,439, filed on Sep. 8, 2000, provisional application No. 60/232,396, filed on Sep. 14, 2000, provisional application No. 60/234,110, filed on Sep. 21, 2000, and provisional application No. 60/234,638, filed on Sep. 22, 2000.

(51) Int. Cl.[7] .............................. B64C 13/16; B64C 9/00
(52) U.S. Cl. ...................... 244/75 R; 244/213; 244/203; 192/223; 188/134; 188/71.5
(58) Field of Search ................................ 244/75 R, 198, 244/213, 214, 76 R, 111, 203; 188/134, 71.5; 192/223, 215

(56) References Cited

U.S. PATENT DOCUMENTS

| 3,596,740 | A | * | 8/1971 | Nau |
| 4,441,675 | A | * | 4/1984 | Boehringer et al. ........ 244/213 |
| 4,459,867 | A | | 7/1984 | Jones |
| 4,633,984 | A | * | 1/1987 | Hudson .................... 244/75 R |
| 4,663,985 | A | * | 5/1987 | Metcalf et al. |
| 4,864,882 | A | * | 9/1989 | Capewell |
| 4,892,274 | A | | 1/1990 | Pohl et al. |
| 5,141,084 | A | * | 8/1992 | Lang et al. ................ 244/75 R |
| 5,484,043 | A | * | 1/1996 | Quick et al. |
| 5,582,390 | A | | 12/1996 | Russ |
| 5,680,124 | A | * | 10/1997 | Bedell et al. ................ 244/213 |
| 5,686,907 | A | * | 11/1997 | Bedell et al. ................ 244/213 |
| 5,743,490 | A | | 4/1998 | Gillingham et al. |
| 6,196,361 | B1 | * | 3/2001 | Russ et al. ................. 244/75 R |
| 6,224,017 | B1 | * | 5/2001 | Fischer et al. .............. 188/134 |
| 6,231,012 | B1 | * | 5/2001 | Cacciola et al. ............ 244/213 |
| 6,299,108 | B1 | * | 10/2001 | Lindstrom et al. ........ 244/75 R |
| 6,366,844 | B1 | * | 4/2002 | Woywod et al. |
| 6,419,606 | B1 | * | 7/2002 | Tengan et al. |

FOREIGN PATENT DOCUMENTS

| EP | 0552560 A1 | 7/1993 |
| EP | 0873937 A2 | 10/1998 |
| WO | WO 97/43557 | 11/1997 |

* cited by examiner

Primary Examiner—Michael J. Carone
Assistant Examiner—Lulit Semunegus
(74) Attorney, Agent, or Firm—Fish & Neave; Joel Weiss; Scott H. Kaliko

(57) ABSTRACT

The apparatus of the invention enables a two-brake torque limiting device to fix the position of one or more flaps and/or slats on an airplane wing when unplanned or abnormal conditions exist. The two-brake torque limiting device may include a trigger brake, a lock down brake, and a speed-increasing device. The trigger brake may use an electromagnetic brake to apply a braking force to the lock down section. The braking force transferred to the lock down section from the trigger section may be transferred through a speed-increasing device. The speed-increasing device allows for the use of a small and a lightweight electromagnetic brake. The invention also provides a method for reducing asymmetry in the wings of an aircraft using an asymmetry detection device, using a trigger brake, using a speed-increasing gear, and using a lock down brake.

13 Claims, 3 Drawing Sheets

TWO-BRAKE TORQUE LIMITING DEVICE

CROSS REFERENCE TO RELATED APPLICATIONS

This application claims the benefit of U.S. Provisional Patent Application No. 60/231,439, filed Sep. 8, 2000; U.S. Provisional Patent Application No. 60/232,396, filed Sep. 14, 2000; U.S. Provisional Patent Application No. 60/234,110, filed Sep. 21, 2000; and U.S. Provisional Patent Application No. 60/234,638, filed Sep. 22, 2000, all of which are hereby incorporated herein in their entireties.

BACKGROUND OF THE INVENTION

This invention relates to a device and a method for reducing asymmetry in the wings of an aircraft. More particularly, this invention relates to reducing asymmetry in the wings of an aircraft by preventing an aircraft's flap/slat actuation system from acting in an unplanned and abnormal fashion.

In designing aircraft wings, a designer must ensure that the wings produce an appropriate lifting force during cruising, landing, and takeoff conditions. Each of these conditions require the aircraft's wings to be configured in a different manner so that an appropriate lifting force is produced. The lifting force produced by an aircraft's wings may be calculated by the formula $(\frac{1}{2}\rho V^2) \times (\text{coefficient of lift}) \times (\text{wing area})$, where $\rho$ is the density of the air and $V$ is the velocity of the aircraft.

During cruising conditions, the aircraft's velocity (typically between 400–600 mile per hour) is generally constant. The aircraft's altitude (typically between 25,000 and 35,000 feet) is also generally constant. The density of the air during cruising conditions is also generally constant because air density is directly related to the altitude at which the air is measured.—i.e., as the altitude increases the density of the air decreases and as the altitude decreases the density of the air increases—. Using the formula described above, the aircraft's velocity is the component that has the greatest impact on the lifting force produced during cruising conditions.

However, when an aircraft begins an approach for landing or begins to taxi for takeoff, its velocity is considerably lower than at cruising conditions. At these lower velocities, the wings may still produce enough lift to carry the aircraft's weight because the air at lower altitudes is denser than the air at cruising altitudes.

Although the wings may produce enough lift, during landing and take off conditions the lift produced is usually not sufficient to accomplish either within a reasonable runway length. To compensate for the lower velocities during landing and takeoff, auxiliary devices (high-lift devices) are added to the leading and trailing edges of the wings to increase the wing's effective camber and area. From the formula described above, increasing the wing's effective camber and area coupled with the increased air density compensates for the lower velocities and allows for a lift to be produced substantially similar to those developed during cruising conditions. The high-lift devices on the leading edge of the aircraft's wing are usually called slats and those added to the trailing edges of the wing are usually called flaps.

FIG. 1 shows one embodiment of aircraft 2 which includes Power Drive Unit (PDU) 5, slat 10, wing tip brake 15, flap 20, drive shaft line 25, local actuator 30, and wing 35. In practice, it is customary to have a plurality of slats, wing tip brakes, flaps, drive shaft lines, local actuators, and wings on the aircraft.

Each slat 10 and flap 20 may be installed on the aircraft's airframe at an appropriate point on the wing. Slat 10 and flap 20 are driven by local actuator 30 and by drive shaft line 25. Drive shaft line 25 may be routed down the leading and trailing edges of wing 35. PDU 5 may provide power to local actuator 30 and drive shaft line 25.

It is also customary to equip each local actuator 30 with a torque limiter (not shown in FIG. 1) because drive shaft line 25 is capable of delivering many times the torque that local actuator 30 could withstand. To prevent local actuator 30 from experiencing excessive torque, each torque limiter may sense the torque that is being transmitted to its associated local actuator. If the torque limiter senses excessive torque, then it may cause wing tip brake 15 to be applied and lock down drive shaft line 25. Each actuator and torque limiter is preferably connected to one of a plurality of drive shaft lines.

When utilizing slats and flaps, it is important to avoid the development of asymmetries in the aircraft's wings—e.g., where slats and flaps on one side of the plane are deployed at a different position than slats and flaps on the other side of the plane, leading to an uneven distribution of lift on the wings that may contribute to instability of the plane—. Asymmetries may develop from many possible causes. For example, if one of the drive shaft lines breaks, then all the slat or flap panels outboard of the break will not be driven by or controlled by the PDU. In addition, if the slat or flap panels outboard of the break are extended, they may be blown back to a cruising position by aerodynamic loads placed upon them. This condition is known as "blow back." Although, the normal flying controls on an aircraft are designed to correct some asymmetry in the slats and flaps, they are not designed to offset the asymmetry that occurs when an aircraft experiences blow back conditions.

To rectify this exigency, aircraft with high lift systems typically have asymmetry detection devices (not shown in FIG. 1), which compare the position of the slats and flaps on each wing. If there are differences exceeding a preset allowance, the asymmetry detection device may immediately apply wingtip brake 15 that may lock slat 10 and flap 20 on each wing 35.

One disadvantage of the wingtip brake is that it is large and heavy. A further disadvantage of the wingtip brake is that the drive shaft line that connects the individual slats and flaps to the wingtip brake might actually be interrupted at several points. For example, due to an engine burst, the drive shaft line might be severed at several points, thus leaving some parts of the drive shaft line not coupled to any brake. The present invention addresses these shortcomings.

It therefore would be desirable to provide a drive shaft line braking device that is small and lightweight.

It would also be desirable to provide a drive shaft line braking device that brakes the drive shaft line at each local actuator.

SUMMARY OF THE INVENTION

Therefore, it is an object of this invention to provide a drive shaft line braking device that is small and lightweight.

It is also an object of this invention to provide a drive shaft line braking device that brakes the drive shaft line at each local actuator.

In accordance with this invention, an apparatus including a two-brake torque limiting device used to fix the position of one or more flaps or slats on an airplane wing is provided. The two-brake torque limiting device preferably includes a speed-increasing gear, a trigger brake, and a lock down brake.

The speed-increasing gear is preferably coupled to a drive shaft line. The speed-increasing gear rotates at a rotational speed proportionally related to and faster than a rotational speed of the drive line shaft.

The trigger brake is preferably coupled to the speed-increasing gear. The trigger brake may apply a braking force to the speed-increasing gear when a control signal is received.

The lock down brake is preferably coupled to the speed-increasing gear. The lock down may apply a braking force to the drive line shaft. The braking force may be based upon the rotational motion of the speed-increasing gear, the drive shaft line, and/or a combination of the rotational motion of the speed-increasing gear and the rotational motion of the drive shaft line.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout.

DETAILED DESCRIPTION OF THE INVENTION

Figure 1:
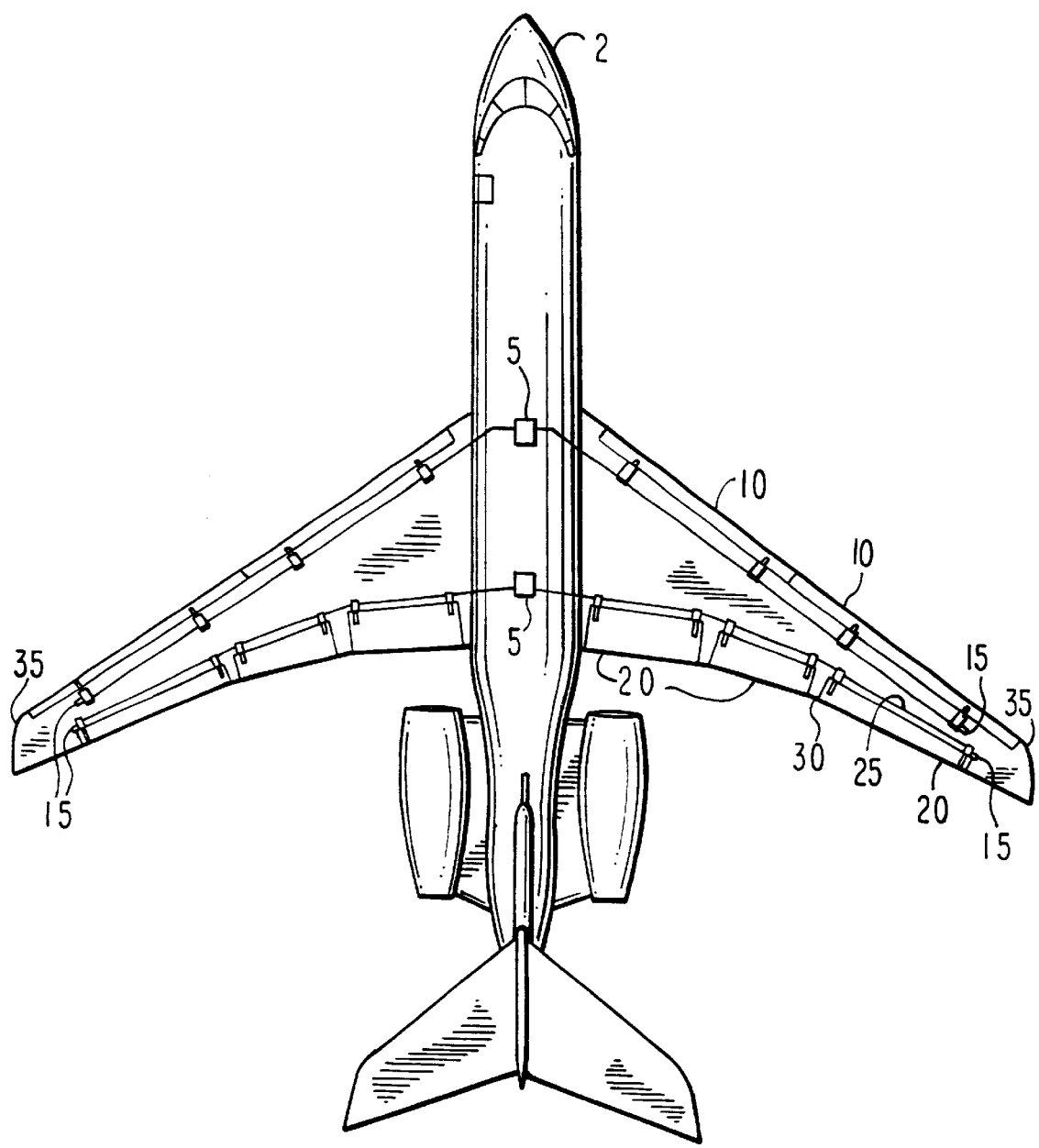
FIG. 1 is a plan view of a prior art aircraft utilizing a slat and flap actuation system in which wingtip brakes are located outboard of the outermost actuator.

An apparatus according to the invention includes a two-brake torque limiting device. The two-brake torque limiting device may preferably be used fix the position of one or more flaps and/or slats on an airplane wing during unplanned or abnormal conditions. The two-brake torque limiting device may include a trigger brake, a lock down brake, and a speed-increasing device.

The trigger brake may receive an input from a flap/slat asymmetry detection device. The asymmetry detection device compares the respective positions of the flaps and slats on each wing of the aircraft. When asymmetry in the flaps and/or slats develops—e.g., one of the flaps or slats goes beyond a preset value relative to the other flaps or slats—, the flap/slat asymmetry detection device may cause the trigger brake to send an input braking force to the lock down brake. In response to the input braking force from the trigger brake, the lock down brake may apply a braking force to halt the rotation of a flap/slat actuator's drive shaft line.

The lock down brake may sense the torque on an actuator associated with an individual flap or slat and may apply a braking force to halt a rotation of the actuator's drive shaft line if the torque on the actuator becomes excessive. The lock down brake may also receive an input braking force from the trigger brake. When such an input braking force is received, the lock down brake may apply the braking force to halt the rotation of the actuator's drive shaft line.

The lock down brake and the trigger brake may be connected by a speed-increasing device. The speed-increasing device may be used to transmit an input braking force from the trigger brake to the lock down brake using less torque than would be required if no speed-increasing device was used. To allow for the use of less torque, the speed-increasing device may be used to increase the rotational speed of the trigger brake as seen by the drive shaft line.

Speeds and torques within a mechanical system are interrelated by the equation (speed)×(torque)=(power).

From this equation it follows that speed and torque are inversely proportional to each other. Therefore, increasing the rotational speed of the trigger brake allows the trigger brake to produce the same power using less torque.

One benefit from requiring less torque is that a smaller trigger brake may be used. The advantage of using a smaller trigger brake is that the size and weight of the trigger brake are reduced. Reducing the size and weight of the trigger brake may allow for the use of one or more such devices.

Another benefit from requiring less torque in using a smaller trigger brake is that the reaction time of the trigger brake may be enhanced. For example, to enhance the reaction time of the trigger brake, the trigger brake may use an electromagnet to generate the input braking force. The reaction time of an electromagnet is determined by its size and coil turns. Smaller electromagnets and their respective turns per coil have faster reaction times than larger electromagnets because the time it takes for the magnetic flux to build up and break down in a small electromagnet is shorter than in a larger electromagnet. Smaller electromagnets also handle less torque than larger electromagnets. As described above, the trigger brake needs to produce only a small braking force—i.e., torque—to cause the lock down brake to halt a rotation of the drive shaft line—. Therefore, a relatively small electromagnet may be used to enhance the reaction time of the trigger brake while providing an appropriate braking force to the lock down section.

Figure 2:
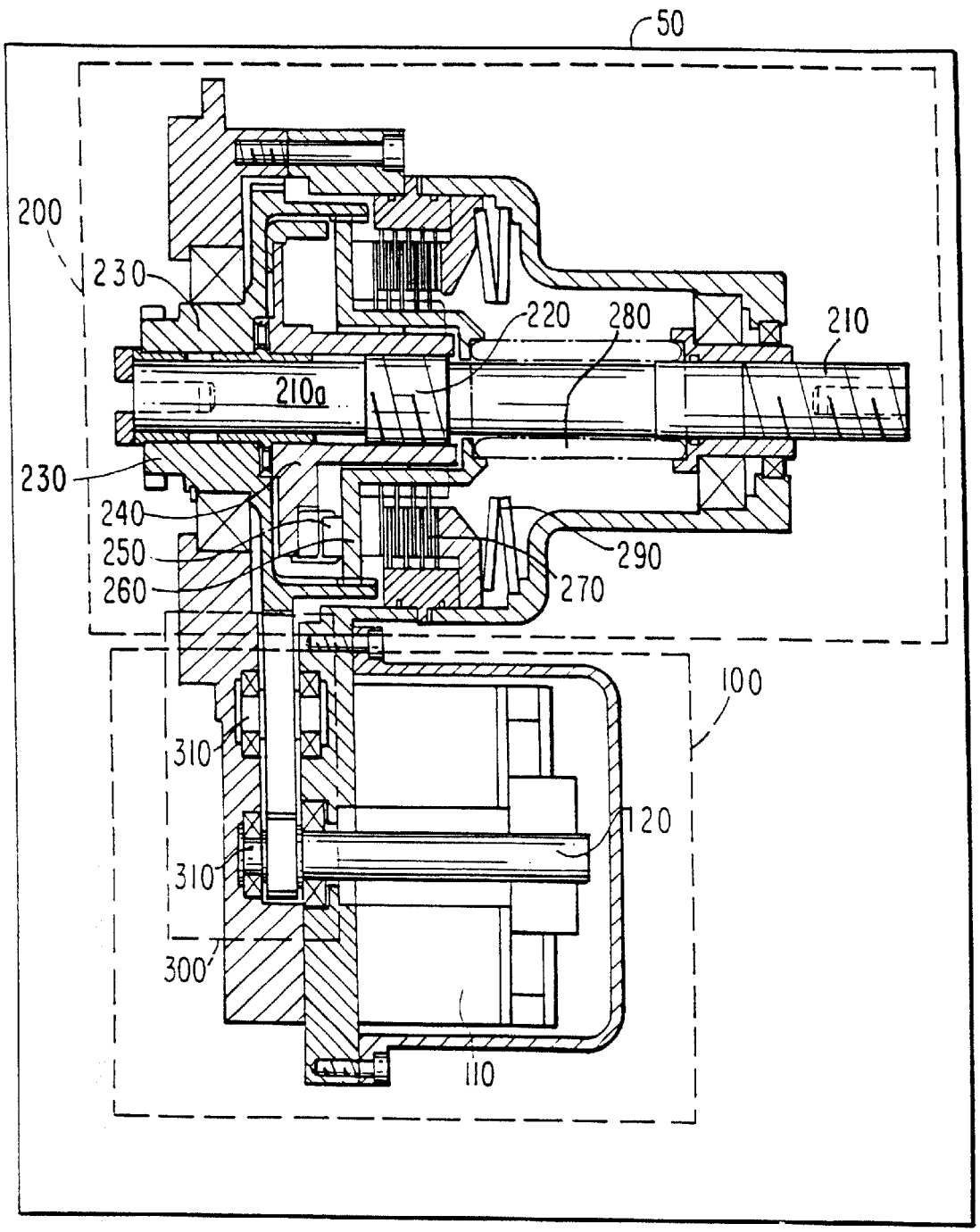
FIG. 2 is a cross-sectional view of a schematic diagram according to the invention of the two-brake torque limiting device.

FIG. 2 is a cross-sectional view of a schematic diagram of one embodiment of apparatus 50 according to the invention. As shown in this view, apparatus 50 includes trigger brake 100, lock down brake 200, and speed-increasing device 300.

Trigger brake 100 may include electromagnetic failsafe brake 110 and output shaft 120. Lock down brake 200 may include input shaft 210, spline 220, output shaft 230, input hub 240, output hub 250, brake hub 260, brake disks 270, compression spring 280, and cushion spring 290. Speed-increasing device 300 may include speed-increasing gears 310.

In the preferred embodiment of the apparatus according to the invention lock down brake 200 may function as follows. The drive side of input shaft 210 and the driven side (210*a*) of input shaft 210 are preferably each coupled to spline 220. Thus, when the driven side of input shaft 210 rotates, torque develops between the drive side of input shaft 210 and the driven side (210*a*) of input shaft 210. The torque may be transferred through spline 220 to input hub 240.

The torque may then be transferred from input hub 240 to output hub 250. Input hub 240 and output hub 250 may, for example, be implemented in a roller ramp arrangement. The torque may then be transferred from output hub 250 to brake hub 260.

Compression spring 280 may hold input hub 240, output hub 250, and brake hub 260 closed until a preset torque level is reached. The size and the spring constant of compression spring 280 may determine the preset torque level. Once the preset torque level is reached, compression spring 280 may begin to compress. As compression spring 280 compresses, brake disks 270 may engage and halt the rotation of input shaft 210 and output shaft 230. To prevent input shaft 210 and output shaft 230 from immediately seizing when brake disk 270 is applied, cushion spring 290 may be used to provide a normal force against brake disks 270 to allow for a "soft stop."

Trigger brake 100 may function as follows. Electromagnetic failsafe brake 110 may be driven by output shaft 120. Output shaft 120 may be driven by speed-increasing device 300. Speed-increasing device 300 may use speed-increasing gears 310 to increase the speed of output shaft 120 and amplify the braking force transmitted to the lock down brake from the trigger brake.

Although not shown in FIG. 2, an asymmetry detection device may send a control signal to trigger brake 100. When trigger brake 100 receives such a signal, electromagnetic failsafe brake 110 may deenergize and apply a braking force through speed-increasing gears 310 to input hub 240. The torque may then be transferred through the lock down brake as described in detail above.

Figure 3:
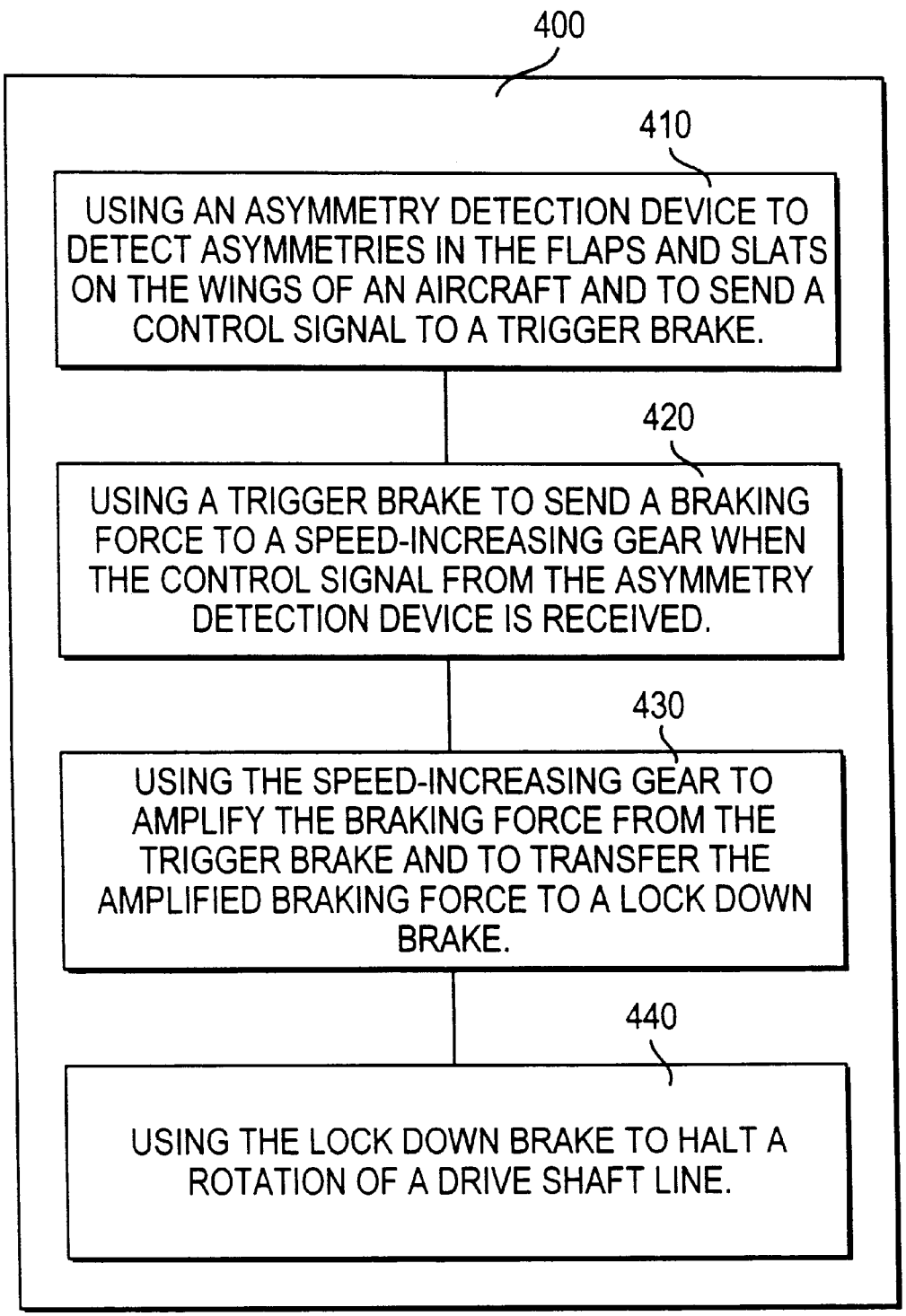
FIG. 3 is a flow chart according to the invention.

FIG. 3 shows a flow chart 400 of the operation of an apparatus according to the invention. Box 410 shows using an asymmetry detection device to detect asymmetries in the flaps and slats on the wings of an aircraft and to send a control signal to a trigger brake. Box 420 shows using the trigger brake to send a braking force to a speed-increasing gear when the control signal from the asymmetry detection device is received. Box 430 shows using a speed-increasing gear to amplify the braking force from the trigger brake and to transfer the amplified braking force to a lock down brake. Box 440 shows using the lock down brake to halt the rotation of a drive shaft line.

Thus, a two-brake torque limiting device is provided. Persons skilled in the art will appreciate that the present invention can be practiced by other than the described embodiments, which are presented for purposes of illustration rather than of limitation, and the present invention is limited only by the claims which follow.

What is claimed is:

1. A two-brake torque limiting device comprising:
    a drive shaft line;
    a speed-increasing gear coupled to the drive shaft line, the gear rotating at a rotational speed that is proportionally related to and faster than a rotational speed of the drive shaft line;
    a trigger brake coupled to the speed-increasing gear, the trigger brake that applies a braking force to the speed-increasing gear when a control signal is received by the trigger brake; and a lock down brake coupled to the speed-increasing gear, the lock down brake that applies a braking force to the drive line shaft based upon one of (a) the rotational motion of the speed-increasing gear and (b) the drive shaft line.

2. The apparatus in claim 1, further comprising a plurality of flaps and slats that are driven by the drive shaft line.

3. The apparatus in claim 2, further comprising an asymmetry detection device that detects asymmetries in the plurality of flaps and slats and sends a control signal to the trigger brake based on a detected asymmetry.

4. The apparatus in claim 1, wherein said lock down brake comprises a roller ramp and one or more brake disks to brake the drive line shaft.

5. The apparatus, in claim 4, wherein said lock down brake further comprises one or more coil springs to set a torque limit value that triggers the lock down brake.

6. The apparatus in claim 1, wherein said trigger brake comprises an electromagnet that applies a braking force to the speed-increasing gear.

7. A two-brake torque limiting device comprising:
    a drive shaft line;
    a speed-increasing gear coupled to the drive shaft line, the gear that rotates at a rotational speed that is proportionally related to and faster than a rotational speed of the drive shaft line;
    a trigger brake coupled to the speed-increasing gear, the trigger brake that applies a braking force to the speed-increasing gear when a control signal is received by the trigger brake;
    a lock down brake coupled to the speed-increasing gear, the lock down brake that applies a braking force to the drive line shaft based upon one of the rotational motion of (a) the speed-increasing gear, (b) the drive shaft line, and (c) a combination of the rotational motion of the speed-increasing gear and the rotational motion of the drive shaft line;
    a plurality of flaps and slats that are driven by the drive shaft line; and
    an asymmetry detection device for detecting asymmetries in a plurality of flaps and slats on the wings of an aircraft and sending the control signal to the trigger brake based upon a detected asymmetry.

8. The apparatus in claim 7, wherein said lock down brake comprises a roller ramp and one or more brake disks to brake the drive line shaft.

9. The apparatus, in claim 7, wherein said lock down brake further comprises one or more coil springs to set a torque limit value that triggers the lock down brake.

10. The apparatus in claim 7, wherein said trigger brake comprises an electromagnet that applies a braking force to the speed-increasing gear.

11. A method for reducing asymmetry in the wings of an aircraft, the aircraft's wings having a plurality of flaps and slats, a plurality of flap/slat actuators that extend and retract the flaps and slats, a plurality of drive shaft lines that drive the flap/slat actuators, and a two-brake torque limiting device that applies a braking force to the drive shaft lines when one of the following occurs 1) one of the torques on the plurality of flap/slat actuators exceeds a preset value 2) a control signal is received from an asymmetry detection device or 3) a combination of 1 and 2, said method comprising the steps of:
    using the asymmetry detection device to detect asymmetries in the flaps and slats on the wings of an aircraft and to send a control signal to a trigger brake based upon a detected asymmetry;
    using a trigger brake to send a braking force to a speed-increasing gear when the control signal from the asymmetry detection device is received;
    using the speed-increasing gear to amplify the braking force and transfer the amplified braking force to a lock down brake; and
    using the lock down brake to halt a rotation of the drive shaft line.

12. The method of claim 11, wherein the using a trigger brake to send a braking signal comprises using an electromagnetic trigger brake to send a braking force to the speed-increasing gear.

13. The method of claim 11, wherein the using a lock down brake to halt the rotation of the drive shaft line comprises using a roller ramp and one or more brake disks to halt the rotation of the drive shaft line.

* * * * *